(12) United States Patent
Karasaridis et al.

(10) Patent No.: US 9,088,554 B1
(45) Date of Patent: Jul. 21, 2015

(54) SYSTEM AND METHOD FOR DATA MODELING

(75) Inventors: Anestis Karasaridis, Oceanport, NJ (US); David A. Hoeflin, Middletown, NJ (US)

(73) Assignee: AT&T INTELLECTUAL PROPERTY II, L.P., Atlanta, GA (US)

(*) Notice: Subject to any disclaimer, the term of this patent is extended or adjusted under 35 U.S.C. 154(b) by 1998 days.

(21) Appl. No.: 11/648,439

(22) Filed: Dec. 29, 2006

(51) Int. Cl.
*G06F 15/16* (2006.01)
*H04L 29/06* (2006.01)

(52) U.S. Cl.
CPC .................................... *H04L 63/08* (2013.01)

(58) Field of Classification Search
USPC ................................................. 709/220, 221
See application file for complete search history.

(56) References Cited

U.S. PATENT DOCUMENTS

| | | | |
|---|---|---|---|
| 5,960,425 A * | 9/1999 | Buneman et al. ...................... 1/1 |
| 6,078,946 A * | 6/2000 | Johnson ......................... 709/200 |
| 6,216,048 B1 * | 4/2001 | Keeler et al. ..................... 700/44 |
| 6,961,415 B2 | 11/2005 | Doherty et al. |
| 7,082,463 B1 | 7/2006 | Bradley et al. |
| 7,099,879 B2 * | 8/2006 | Tacaille et al. ................ 707/100 |
| 7,124,188 B2 | 10/2006 | Mangipudi et al. |
| 7,149,917 B2 | 12/2006 | Huang et al. |
| 2004/0015463 A1 * | 1/2004 | Herrera et al. .................. 706/47 |
| 2004/0068332 A1 * | 4/2004 | Ben-Gal et al. ................. 700/51 |
| 2005/0198042 A1 * | 9/2005 | Davis .............................. 707/10 |

* cited by examiner

*Primary Examiner* — Djenane Bayard
(74) *Attorney, Agent, or Firm* — Fay Kaplun & Marcin, LLP

(57) ABSTRACT

A system and method for receiving a plurality of values related to providing services on a network, determining at least one constraint value based on the plurality of values, performing a distribution analysis using the plurality of values and the at least one constraint value and outputting a result derived from the distribution analysis.

18 Claims, 7 Drawing Sheets

SYSTEM AND METHOD FOR DATA MODELING

BACKGROUND

Network providers often provide network services to clients where the services are defined through contract negotiations. Furthermore, the contracts may define performance guarantees prior to deployment of the services or sites. Specifically, the Service Level Agreements (SLA) define the minimum levels of quality or availability of a service and a corresponding penalty schedule for violation of these minimum requirements.

When a standard SLA is absent, the SLA is usually drafted in an expedited manner to provide services to the client in a timely fashion. When a standard SLA exists, a client may request the SLA to be updated or altered to reflect stricter requirements. In either scenario, only a small set of statistics will be known. Thus, the service provider is unable to collect an exhaustive long-term set of measurements that would provide detailed data for the modeling of quantities such as long-term site availability or latency. Even when measurements may be gathered, there may be a deficiency that denies the user from modeling. One result is the penalty schedule incorporated in the SLA may create heavy losses to the service provider.

SUMMARY OF THE INVENTION

A method for receiving a plurality of values related to providing services on a network, determining at least one constraint value based on the plurality of values, performing a distribution analysis using the plurality of values and the at least one constraint value and outputting a result derived from the distribution analysis.

A system for an input module to receive a plurality of values relating to providing services on a network, a calculation module to determine at least one constraint value depending on the plurality of values, a processor to perform a distribution analysis given the plurality of values and the at least one constraint value and an output module to output a result derived from the distribution analysis.

DESCRIPTION OF THE DRAWINGS

FIG. 2 shows a second interface for a data modeling element according to an exemplary embodiment of the present invention.

DETAILED DESCRIPTION

Figure 1:
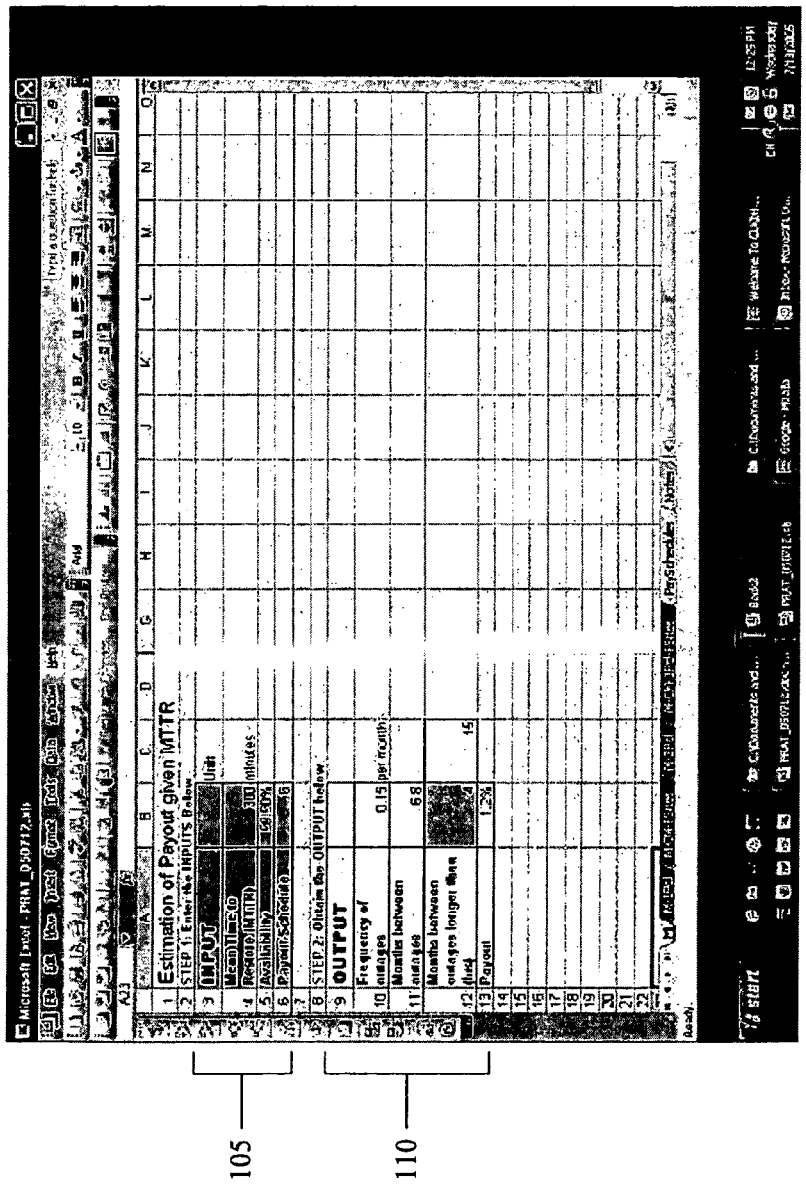
FIG. 1 shows a first interface for a data modeling element according to an exemplary embodiment of the present invention.

The present invention may be further understood with reference to the following description and the appended drawings, wherein like elements are referred to with the same reference numerals. The exemplary embodiments of the present invention describe a system and method for a data modeling element to model data for determining a payout risk associated with minimum levels of quality or availability of a service. According to the exemplary embodiments of the present invention, the data modeling element receives a set of available inputs and uses the inputs in conjunction with a set of constraints to output a distribution according to the Maximum Entropy Principle (MEP). The inputs, constraints, distribution, and MEP will be described in more detail below. Each exemplary embodiment of a data modeling element incorporates a different set of inputs and a different set of constraints. Furthermore, each interface of the exemplary embodiments is shown on a spreadsheet program where an input into a given cell correlates to a formula in order to display a result in another cell. However, those skilled in the art will understand that other methods of inputting the data to the data modeling element and providing the results from the data modeling element may also be used. In addition, the inputs and constraints used in the example are not limiting. Other inputs and constraints may be used depending on the problem that is to be solved.

Network providers are continuously faced with the challenge of offering competitive remedies for SLA violations while managing the risk of reduced earnings. Cases where limitations in data collection and/or in planning scenarios with no data pose challenges in getting a clear picture of the performance and reliability of the transport network and the offered services. The limitations may be internal. That is, with a limited time to prepare, little to no data may be collected. The limitations may also be external. That is, when providing end-to-end latency guarantees across multiple provider networks, only a limited set of measurement statistics may be supplied by each network provider. In either case, the lack of data does not allow the service provider to efficiently determine the payout risks. Those skilled in the art will understand that in determining a distribution, more data provides a better solution that covers more uncertainties.

A conventional modeling approach involves using a fitted model that has been found appropriate for an existing set of data and to modify it for every new set of data. However, this approach requires statistical experts to evaluate the goodness of fit. The goodness of fit will be described in detail below. This approach is also susceptible to the need for a predetermined amount of data. A lack of the predetermined amount of data significantly reduces the ability to create an accurate model. Furthermore, service providers often need to determine payout risks according to hypothetical scenarios. Since the conventional modeling approach utilizes the existing set of data, hypothetical data would be difficult to accommodate.

The exemplary embodiments of the data modeling element utilize a modeling methodology that is based on the MEP. The approach used by the present invention requires a relatively small set of data inputs and does not require expert statistical advice on the goodness of fit. Specifically, the exemplary embodiments assist service providers in modeling quantities such as time to restore (TTR), which is essential for payout risk analysis of proposed SLAs. In contrast to conventional methods, the exemplary embodiments allow a user to input a minimum amount of generally available data. With this data, a maximum-entropy distribution under different constraints may be applied to the TTR SLA problem. It should be noted that the methodology of the exemplary embodiments may be applied to further applications beyond TTR. Those skilled in the art will also understand that the methodology of the exemplary embodiments may be applied to any problem faced with a modeling methodology and a distribution analysis.

A distribution has a good fit when all given constraints are met, little to no additional constraints are imposed, and coverage is maximized (i.e., "spread out"). The MEP states that if a distribution, p, is to encompass the most uncertainty and satisfy all imposed constraints, an entropy function should be maximized. If entropy is denoted E, then the entropy function may be denoted as: E=−∫p(x)log(p(x))dx=MAX (hereinafter "equation 1"). The MEP implies that when p has positive support on $R^+$ (i.e., $[0, \infty)$), p has the form:

$$p(x) = \frac{1}{Z}\exp\left\{-\sum_j \lambda_j f_j(x_i)\right\},$$

(hereinafter "equation 2") where $\lambda_j$ are Langrange multipliers that are calculated based on the constraints, $f_j$ are functions of the probability space used to define the constraints, and Z is the partition function which is defined as $$Z = \int \exp\left\{-\sum_j \lambda_j f_j(x)\right\} dx$$

(hereinafter "equation 3").

The present methodology utilizes an advantage in that if a distribution were to be picked at random from all distributions that satisfy the known set of constraints, the maximum entropy p would be the most probable. Therefore, to not use the maximum entropy p is to assume there is additional information that was not in the stated constraints or purposely selecting a distribution satisfying constraints that are less probable.

The constraints on p may be generally expressed by $E_p[f_j(x)]=R_j$ (hereinafter "equation 4"), where $R_j$ are the constraints. For example, if there is a constraint on the mean of p, then $E_p[x]=R_1$ (hereinafter "equation 5"), and therefore, $f_1(x)=x$. In general, $R_j$ are related to Z and $\lambda_j$ with the following:

$$\frac{\partial Z/\partial \lambda_j}{Z} + R_j = 0,$$

∀j (hereinafter "equation 6"). Thus, a set of non-linear equations that are solved for the parameters may be determined.

In the following description, the exemplary embodiments use a select group of constraint functions that are of low order moments, low order conditional moments, and/or percentiles. For such sets of constraints, Z may be derived analytically and the problem reduces to solving the set of non-linear equations stated in equation 6. It should be noted that low order usually refers to first order (e.g., mean or conditional mean). Those skilled in the art will understand that the restrictions on $R_j$ are not as limiting as conventional methodologies. That is, conventional methodologies use natural process statistics that are typically the overall mean, a few percentiles, and occasionally a conditional mean.

FIG. 1 shows a first interface 100 for a data modeling element according to an exemplary embodiment of the present invention. The first interface 100 includes a single constraint value, the mean of p. As illustrated in the first interface 100, inputs 105 are entered by a user. When the mean of p is the one constraint value, the inputs 105 include a mean time to restore (MTTR), an availability, and a payout schedule.

The MTTR refers to the average time taken for a service provider to restore the offered service upon the service failing. For example, the service may be for a site on a network, a connection to a network, a certain amount of bandwidth, etc. The MTTR may be represented in minutes, hours, etc. Thus, when entering the MTTR field, the user inputs the figure commensurate with the proper unit. For example, when data shows that it takes an average of 5 hours to restore a downed site, the user inputs 300 into the field. The type of unit for this field may be altered to accommodate the user.

The availability refers to the percentage of time in a given time reference that the service is provided to the client. Optimally, the availability should be across sites and for the longest available time period where the configuration of the site remains the same. The availability may be represented in a percent, time, etc. In the exemplary embodiment, the availability is shown in percentages. For example, in a finite time period, the service provider may have provided the service to the client 99.90% of the time. The type of unit for this field may be altered to accommodate the user.

The payout schedule refers to a tiered payout schedule that is subjective to the service provider. The service provider may have several levels of payout schedules depending on a variety of factors. For example, a first level may be used for local (e.g., intrastate) clients, a second level may be used for non-local, domestic (e.g., interstate) clients, a third level for international clients, etc. The tiered payout schedule may have, for example, 6 tiers. In this example, a tier 6 payout schedule is used. The tiered payout schedule may be stored in a separate spreadsheet (when the present invention is used on a spreadsheet program), incorporated in a database that is accessed (when the present invention is used on a stand-alone program), etc. It should be noted that the tiered payout schedule may be inputted by the user prior to use, inputted during the course of use, altered depending on the service provider, etc.

With the inputs 105 entered, the data modeling element may apply the MEP as discussed above, with consideration to the number of constraints. In FIG. 1, the single constraint value is the mean of p. Thus, the maximum entropy p function has the following form: $p(x)=(1/Z)\exp\{-\lambda_1 x\}$ (hereinafter "equation 7"), where $$Z = \int_0^\infty \exp(-\lambda_1 x)dx = 1/\lambda_1$$

(hereinafter "equation 8"). It should be noted that the integral is taken from 0 to ∞ due to the assumption of p having positive support on $R^+$. The constant $\lambda_1$ may be calculated based on the constraint using equation 6 with the following:

$$\frac{-1/\lambda_1^2}{1/\lambda_1} + R_1 = 0 \Rightarrow \lambda_1 = 1/R_1.$$

Thus, $p(x)=(1/R_3)\exp\{-x/R_1\}$ (hereinafter "equation 10"), where $R_1$ is the mean of the distribution p(x). If for example p(x) is the distribution of the TTR then $R_1$ would be the Mean Time to Restore (MTTR).

Applying the above analysis to the inputs 105, the outputs 110 may be displayed. In the exemplary embodiment, the outputs 110 may include frequency of outages, months between outages, a conditional months between outages, and a payout.

The frequency of outages refers to an amount of outages (e.g., failure of service) occurring on average. The frequency of outages may be for given in units of time such as weekly, monthly, bi-monthly, semi-annually, annually, etc. With the exemplary inputs 105 described above, the frequency of outages that results from the above analysis is 0.15 times per month. The type of unit for this field may be altered to accommodate the user.

The months between outages refers to an average time from one outage to another outage. This field may also be represented in other units of time such as weeks, years, etc. The conditional months between outages also refers to an average time from one outage to another outage except the chosen outages are subject to a condition. For example, the outages may be selected based on an amount of time to restore beyond a threshold value (e.g., 4 hours). The conditional months between outages may include an input field where a user may further define the threshold value. When no threshold value is entered, a standard value may be used. In the exemplary embodiment, with the given inputs 105, the months between outages is 6.8 months while the conditional months between outages where the outage lasted longer than 4 hours is 15. The type of unit for these fields may be altered to accommodate the user.

The payout refers to the percentage of fees that are expected to be returned to the client due to outages for services rendered. The payout may also be represented as, for example, an aggregate sum of payouts for a current duration of the SLA, an expected total payout for a contract term of the SLA, etc. If the payout represents the percentage of fees, the payout may be based on a time reference such as yearly, bi-yearly, etc. In the exemplary embodiment, the payout is viewed annually and with the inputs 105, the payout results in 1.2%. It should be noted that the payouts may be displayed as being in excess of 100% (i.e., return more than earnings from client). In such a scenario, an alert may be displayed.

Figure 2:
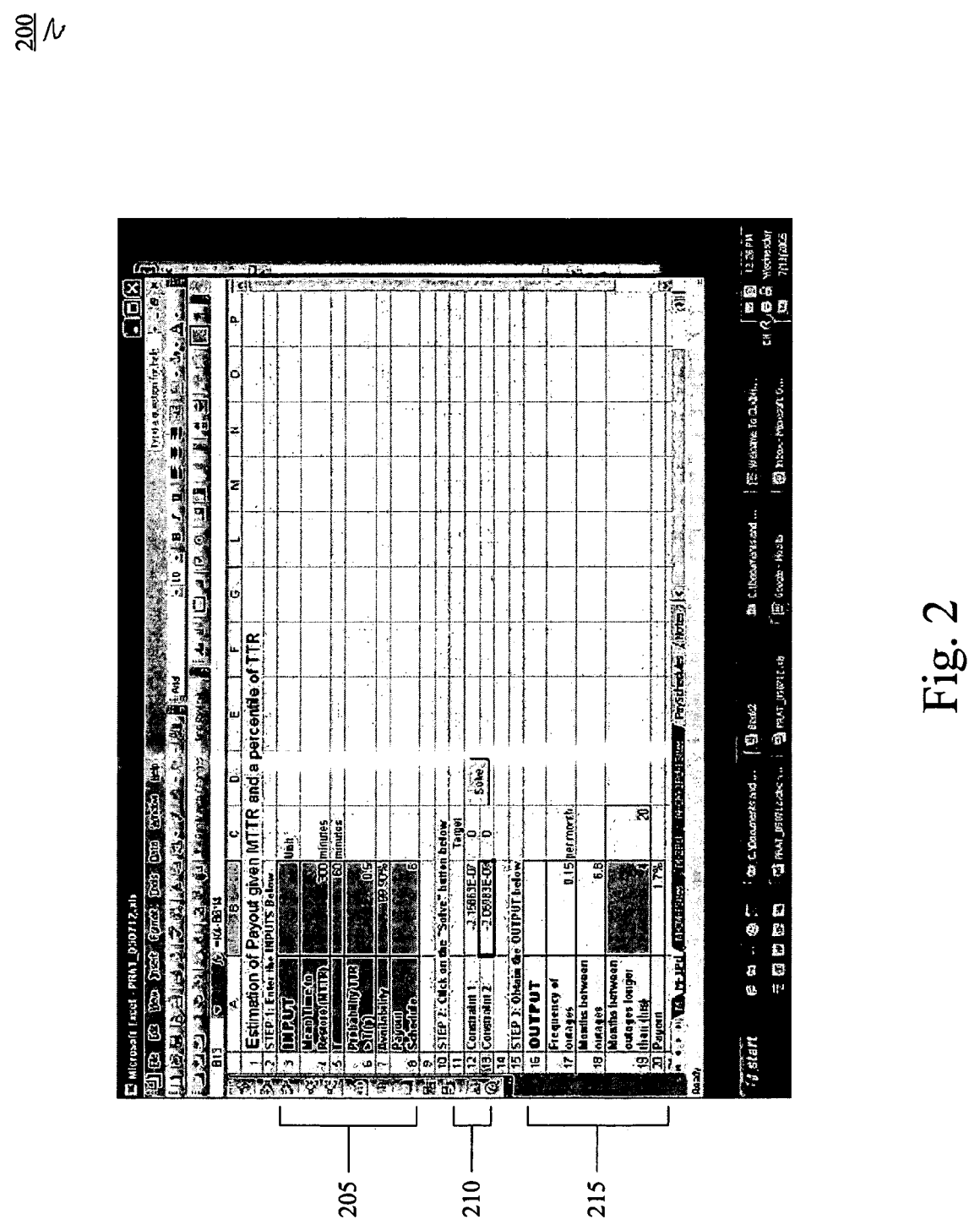

FIG. 2 shows a second interface 200 for a data modeling element according to an exemplary embodiment of the present invention. The second interface 200 includes two constraints, the mean of p and a percentile value. As illustrated in the second interface 200, inputs 205 are entered by a user. When the mean of p and the percentile value are the two constraints, the inputs 205 include a mean time to restore (MTTR), a time (T), a probability (p) that the time to restore (TTR) exceeds T, an availability, and a payout schedule. The MTTR, availability, and payout schedule were discussed above with reference to the first interface 100 of FIG. 1. In the second interface 200, the MTTR value may be 300 minutes; the availability may be 99.90%, and the payout schedule may be 6.

The time T refers to an argument in the TTR distribution for which the user has some available data such as relating to the SLA, to dispatch time, etc. Specifically, in the exemplary embodiment, T is a threshold value that a user selects to establish a minimal time figure. T is used in combination with the TTR, as will be discussed below. T may be specified in minutes, hours, etc. In the exemplary embodiment, the value of T is 60 (i.e., 1 hour). The type of unit for this field may be altered to accommodate the user.

The TTR refers to each individual time range a service provider takes to restore a failed service. Thus, the p that the TTR exceeds T (i.e., TTR>T) is a ratio or percentile of the times that the TTR has actually exceeded T. For example, if a service has failed 4 times and the TTR for each failure was 30 minutes, 45 minutes, 50 minutes, and 75 minutes, then the p that the TTR exceeded T of 60 minutes is ¼ or 25%. In another example and as illustrated in the exemplary embodiment, after gathering the necessary data and assuming a T of 60 minutes, if the service provider is aware that 50% of the failures took over an hour to restore, then p=0.5.

In contrast to the first interface 100, the second interface 200 displays constraints values 210 which refer to the constraints on the mean of p and the percentile value. The target values for the constraint equations are optimally 0. After entering the inputs 205, the constraint values 210 display the resulting values for the two constraint equations. The second interface 200 may include a "solve" option that a user selects to solve the non-linear constraint equations. The second interface 200 may also automatically display the constraint values 210. In either scenario, the user is able to view whether a solution for the constraints is valid (i.e., constraint values are 0 or negligible). When a solution is found, given the constraints, the second interface 200 may inform the user with a message. This message may include an initial notification indicating that a solution was found with a follow-up notification indicating the validity of the solution. For example, if a valid solution is found, the message may indicate to the user that all constraints and optimality conditions were satisfied or the message may indicate otherwise. The second interface 200 may further allow the user to keep or discard the solutions to the constraint equations. If the user keeps the values displayed in 210, then the second interface 200 may proceed to determine the results. Otherwise, if the user discards the values, a new set of inputs 205 are entered. It should be noted that no solution may exist for a set of given inputs and constraints or the set of inputs are ill-defined. In the exemplary embodiment, given the inputs 205, the first constraint value may be $-2.15863 \times 10^{-7}$ while the second constraint value may be $-2.05983 \times 10^{-9}$. The process to determine the constraint values 210 will be discussed below.

Initially, the constraint equations are solved by the data modeling element upon entering the inputs 205. By again applying the MEP, the two constraints being the mean of p and the value of a percentile, the maximum entropy p function has the following form: $p(x)=(1/Z)\exp\{-(\lambda_1 x + \lambda_2 I(x,x_0))\}$ (hereinafter "equation 11"), where $I(x,x_0)$ is an indicator function that equals to 1 for $x \geq x_0$ and 0 for $x < x_0$. The constant $x_0$ corresponds to the constraint on the percentile $P(x \geq x_0) = R_2$ (hereinafter "equation 12").

Applying equation 3, Z may have the following form: $Z=(1/\lambda_1)(\exp\{-\lambda_1 x_0\}(\exp\{-\lambda_2\}-1)+1)$ (hereinafter "equation 13"). Thus, the variables $\lambda_1$ and $\lambda_2$ may be calculated by solving a system of two non-linear equations using equation 6. The processing unit to solve the non-linear numerical equations may be included within the present invention or may be provided using a separate processor found in packages such as Mathematica or Excel.

Applying the above analysis to the inputs 205, the outputs 215 may be displayed. In the exemplary embodiment, the outputs 215 may include frequency of outages, months between outages, a conditional months between outages, and a payout. These outputs were discussed above with reference to the first interface 100 of FIG. 1.

Specifically, with the inputs 205, the frequency of outages that results from the above analysis is 0.15 times per month. The months between outages is 6.8 months while the conditional months between outages where the outage lasted longer than 4 hours is 20. With the payout having an annual time frame, the payout results in 1.7%.

Figure 3:
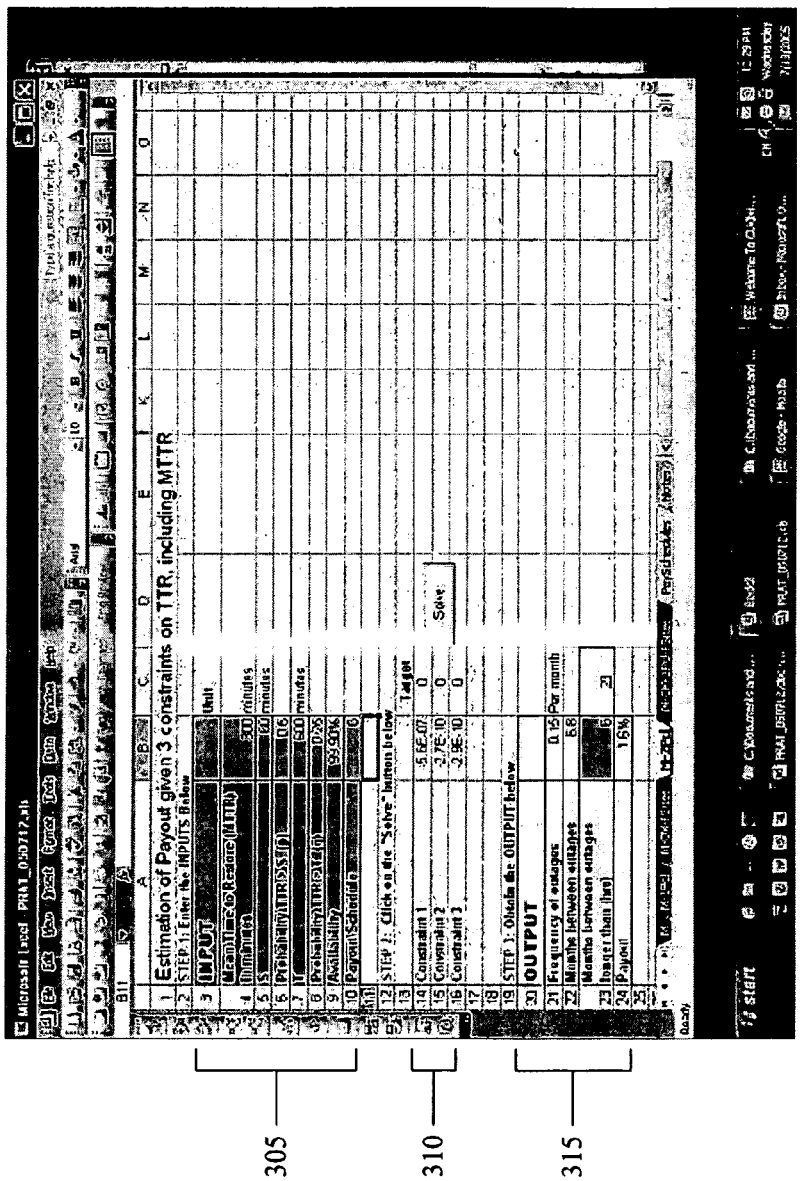
FIG. 3 shows a third interface for a data modeling element according to an exemplary embodiment of the present invention.

FIG. 3 shows a third interface 300 for a data modeling element according to an exemplary embodiment of the present invention. The third interface 300 includes three constraints, the mean of p and two percentile values. As illustrated in the third interface 300, inputs 305 are entered by a user. When the mean of p and the two percentile values are the three constraints, the inputs 305 include a mean time to restore (MTTR), a first time (S), a first probability (p1) the TTR exceeds S, a second time (T), a second probability (p2) the TTR exceeds T, an availability, and a payout schedule. The MTTR, availability, and payout schedule were discussed above with reference to the first interface 100 of FIG. 1. The TTR was discussed above with reference to the second interface 200 of FIG. 2. In the third interface 300, the MTTR value may be 300 minutes; the availability may be 99.90%, and the payout schedule may be 6.

The times T and S refer to an argument in the TTR distribution for which the user has some available data such as relating to the SLA, to dispatch time, etc. Specifically, in the exemplary embodiment, S and T are threshold values that a user selects to establish a minimal time figure. S and T are used in combination with the TTR, as will be discussed below. S and T may be specified in minutes, hours, etc. In the exemplary embodiment, the value of S is 60 (i.e., 1 hour) while the value of T is 600 (i.e., 10 hours). The type of unit for this field may be altered to accommodate the user.

The p1 that the TTR exceeds S (i.e., TTR>S) is a ratio or percentile of the times that the TTR has actually exceeded S. The p2 that the TTR exceeds T (i.e., TTR>T) is a ratio or percentile of the times that the TTR has actually exceeded T. For example and as illustrated in the exemplary embodiment, after gathering the necessary data and assuming an S of 60 minutes and a T of 600 minutes, if the service provider is aware that 50% of the failures took over an hour to restore and 25% of the failures took over 10 hours to restore, then p1=0.5 while p2=0.25.

In contrast to the first interface 100 and akin to the second interface 200, the third interface 300 displays constraint values 310 which refer to the constraint equations on the mean of p and the two percentile values. It should again be noted that the target value for the constraints is optimally 0. The method and options for displaying the constraint values 310 may be identical to the method and options for displaying the constraint values 210 of the second interface 200. It should also again be noted that no solution may exist for a set of given inputs and constraints or the set of inputs are ill-defined. In the exemplary embodiment, given the inputs 305, the first constraint value may be $-5.6 \times 10^{-7}$, the second constraint value may be $-2.7 \times 10^{-10}$, and the third constraint value may be $-2.9 \times 10^{-10}$. The process to determine the constraint values 310 will be discussed below.

Initially, the constraint equations are solved by the data modeling element upon entering the inputs 305. By again applying the MEP and including variables discussed above with equation 11, the three constraints being the mean of p and the two values of a percentile, the maximum entropy p function has the following form: $p(x)=(1/Z)\exp\{-(\lambda_1 x+\lambda_2 I(x,x_0)+\lambda_3 I(x,x_1))\}$ (hereinafter "equation 14"). The constant $x_1$ corresponds to the constraint on the second percentile $P(x \geq x_1)=R_3$ (hereinafter "equation 15"). Those skilled in the art will understand that the maximum entropy density is similar to that found for equation 11 with an additional multiplier $\lambda_3$ and indicator function $I(x,x_1)$ to account for the second percentile.

Applying equation 3, Z may have the following form:

$$Z = \frac{e^{-(\lambda_2+\lambda_3)}e^{-\lambda_1 x_1}}{\lambda_1} \frac{e^{-\lambda_1 x_0}-1}{\lambda_1} - e^{-\lambda_2}\frac{e^{-\lambda_1 x_1}-e^{-\lambda_1 x_0}}{\lambda_1}$$

(hereinafter "equation 16"). Thus, the variables $\lambda_1$, $\lambda_2$, and $\lambda_3$ may be calculated by solving a system of three non-linear equations using equation 6. Again, the processing unit to solve the non-linear numerical equations may be included within the exemplary data modeling element or may be provided using a separate processor.

Applying the above analysis to the inputs 305, the outputs 315 may be displayed. In the exemplary embodiment, the outputs 315 may include frequency of outages, months between outages, a conditional months between outages, and a payout. These outputs were discussed above with reference to the first interface 100 of FIG. 1.

Specifically, with the inputs 305, the frequency of outages that results from the above analysis is 0.15 times per month. The months between outages is 6.8 months while the conditional months between outages where the outage lasted longer than 6 hours is 23. With the payout having an annual time frame, the payout results in 1.6%.

Figure 4:
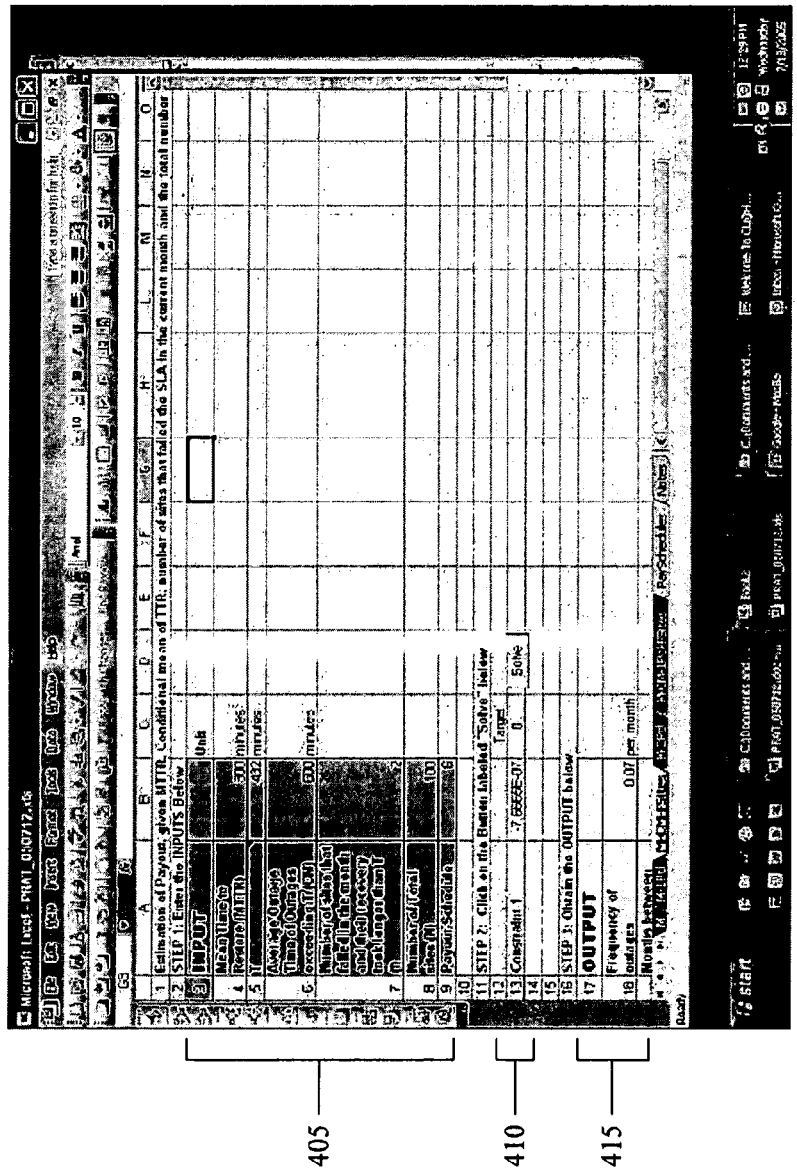
FIG. 4 shows a fourth interface for a data modeling element according to an exemplary embodiment of the present invention.

FIG. 4 shows a fourth interface 400 for a data modeling element according to an exemplary embodiment of the present invention. The fourth interface 400 includes two constraints, the mean of p and a conditional mean of p. As illustrated in the fourth interface 400, inputs 405 are entered by a user. When the mean of p and the conditional mean of p are the two constraints, the inputs 405 include a mean time to restore (MTTR), a time (T), an average outage time of outages exceeding T (CM), a number of sites that failed in the month and corresponding recovery exceeding T (F), and number of total sites (N), and a payout schedule. The MTTR and payout schedule were discussed above with reference to the first interface 100 of FIG. 1. In the fourth interface 400, the MTTR value may be 300 minutes and the payout schedule may be 6.

The time T refers to an argument in the TTR distribution for which the user has some available data such as relating to the SLA, to dispatch time, etc. Specifically, in the exemplary embodiment, T is a threshold value that a user selects to establish a minimal time figure. T is used in combination with the CM and F, as will be discussed below. T may be specified in minutes, hours, etc. In the exemplary embodiment, assuming the SLA is set at 99% availability, the value of T is 432 (i.e., 432 minutes in a month with 30 days and 1% of downtime). The type of unit for this field may be altered to accommodate the user.

The CM refers to an average of the outage duration for all outages that exceeded T (i.e., CM>T). Because CM concerns outages exceeding T, the value of CM is larger than T. For example, in the exemplary embodiment, CM may be 600 minutes. The type of unit for this field may be altered to accommodate the user.

The F refers to the number of sites that failed in the current month and the corresponding outage duration exceeded T. It should be noted that the use of the time frame of one month is only exemplary and the time frame may be a set number of months, a year, etc. Similar to CM, the value of F is also larger than T. For example, in the exemplary embodiment, F may be 2 to represent 2 sites that failed and took longer than T to restore.

The N refers to the total number of sites that have the same payout schedule. Those skilled in the art will understand that the value of N is dependent on the client, the number of services that are provided to the client, the payout schedule for the client, etc. For example, in the exemplary embodiment, a client may have 100 sites that are on tier 6 of the payout schedule. Thus, N=100.

Similar to the second interface 200 and the third interface 300, the fourth interface 400 displays constraint values 410 which refer to the constraint equations on the mean of p and the conditional mean of p. It should again be noted that the target value for the constraints is optimally 0. The method and options for displaying the constraint values 410 may be identical to the method and options for displaying the constraint values 210 of the second interface 200 and the constraint values 310 of the third interface 300. It should also again be noted that no solution may exist for a set of given inputs and constraints or the set of inputs are ill-defined. In the exemplary embodiment, given the inputs 405, the first constraint value may be $-7.6665 \times 10^{-7}$. The process to determine the constraint value 410 will be discussed below.

Initially, the constraint equations are solved by the data modeling element upon entering the inputs 405. By again applying the MEP, the constraint on the conditional mean may have the following form: $E(x|x>x_0)=R_2$ (hereinafter "equation 17"). Equation 17 is equivalent to the either of the following expressions:

$$\frac{\int_{x_0}^{\infty} xp(x)dx}{\int_{x_0}^{\infty} p(x)dx} = R_2$$

(hereinafter "equation 18") or $\int_0^{\infty}(x-R_2)p(x)dx=0$ (hereinafter "equation 19"). Equations 17-19 imply that following expressions: $p(x)=(1/Z)\exp\{-(\lambda_1 x+\lambda_2(x-R_2)I(x,x_0))\}$ (hereinafter "equation 20") and $$Z = -\frac{1}{\lambda_1}(e^{-\lambda_1 x_0} - 1) + \frac{1}{\lambda_1 + \lambda_2} e^{-(\lambda_1+\lambda_2)x_0+\lambda_2 R_2}$$

(hereinafter "equation 21"). Thus, the variables $\lambda_1$ and $\lambda_2$ may be calculated by solving a system of two non-linear equations using equation 6. Again, the processing unit to solve the non-linear numerical equations may be included within the data modeling element or may be provided using a separate processor.

Applying the above analysis to the inputs 405, the outputs 415 may be displayed. In the exemplary embodiment, the outputs 415 may include frequency of outages, months between outages, a conditional months between outages, a measured availability, and a payout. These outputs were discussed above with reference to the first interface 100 of FIG. 1. The measured availability is a calculated amount that a service is rendered as opposed to the given value for the availability.

Specifically, with the inputs 405, the frequency of outages that results from the above analysis is 0.07 times per month. The months between outages is 14.7 months while the conditional months between outages where the outage lasted longer than 4 hours is 28. The measured availability is 99.95%. With the payout having an annual time frame, the payout results in 0.5%.

Figure 5:
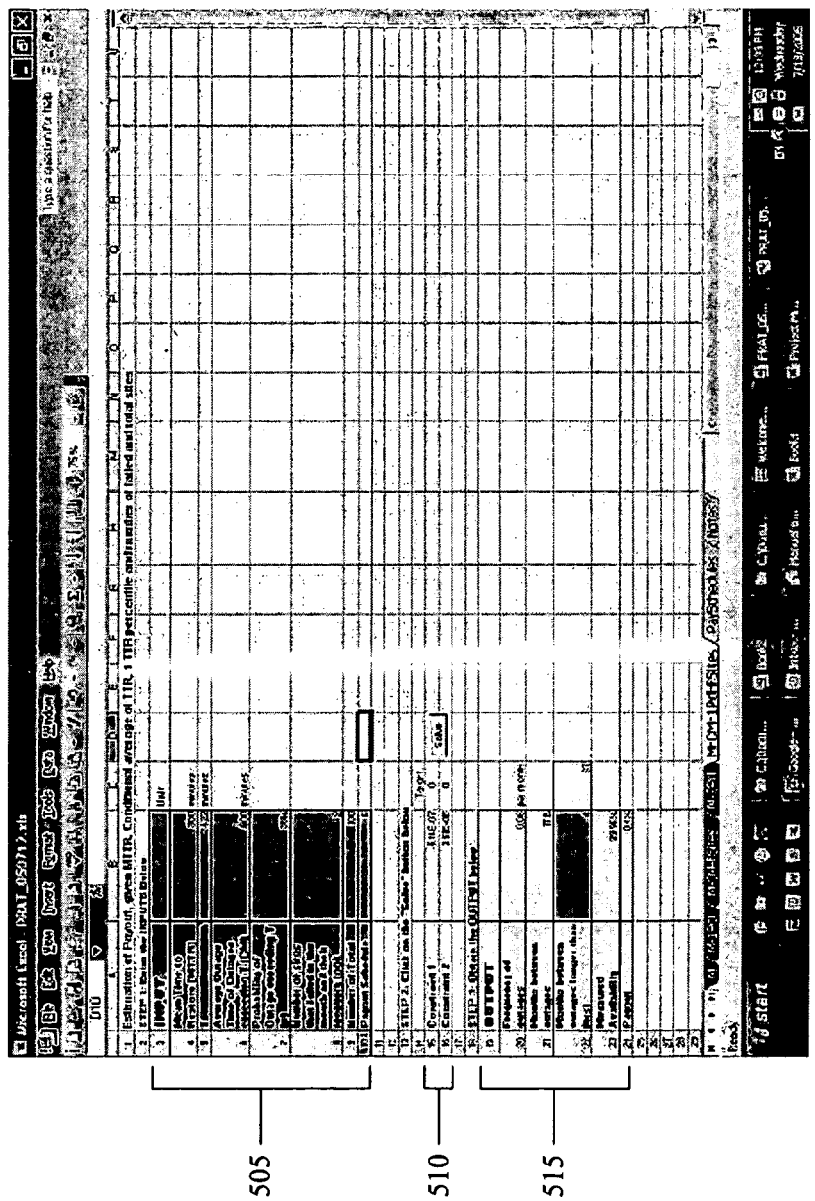
FIG. 5 shows a fifth interface for a data modeling element according to an exemplary embodiment of the present invention.

FIG. 5 shows a fifth interface 500 for a data modeling element according to an exemplary embodiment of the present invention. The fifth interface 500 includes three constraints, the mean of p, a conditional mean of p, and a percentile value. As illustrated in the fifth interface 500, inputs 505 are entered by a user. When the mean of p, the conditional mean of p, and the percentile value are the three constraints, the inputs 505 include a mean time to restore (MTTR), a time (T), an average outage time of outages exceeding T (CM), a probability (p) the outage exceeds T, a number of sites that failed in the month and corresponding recovery exceeding T (F), and number of total sites (N), and a payout schedule. The MTTR, time T, CM, F, N, and payout schedule were discussed above with reference to the fourth interface 400 of FIG. 4. In the fifth interface 500, the MTTR value may be 300 minutes; T may be 432 minutes; CM may be 600 minutes; F may be 2; N may be 100; and the payout schedule may be 6. The probability p refers to a ratio or percentage that any outage exceeds T (i.e., outage time>T). In the exemplary embodiment, assuming 35% of all outages exceeded 432 minutes, then p=35% or 0.35.

Similar to the fourth interface 400, the fifth interface 500 displays constraint values 510 which refer to the conditional mean of p and the percentile value. It should again be noted that the target value for the constraints is optimally 0. The method and options for displaying the constraint values 510 may be identical to the method and options for displaying the constraint values 510 of the second interface 200. It should also again be noted that no solution may exist for a set of given inputs and constraints or the set of inputs are ill-defined. In the exemplary embodiment, given the inputs 505, the first constraint value may be $-5.14 \times 10^{-7}$ while the second constraint value may be $3.61 \times 10^{-8}$. The process to determine the constraint values 510 will be discussed below.

Initially, the constraint equations are solved by the data modeling element upon entering the inputs 505. By again applying the MEP, the three constraints being the mean of p, the conditional mean of p, and the value of a percentile such as $P(x>x_0)=R_3$ (hereinafter "equation 22"), the maximum entropy p function has the following form: $p(x)=(1/Z)\exp\{-(\lambda_1 x+\lambda_2(x-R_2)+\lambda_3)I(x,x_0))\}$ (hereinafter "equation 23").

Applying equation 3, Z may have the following form:

$$Z = \frac{1}{\lambda_1 + \lambda_2} e^{-(\lambda_1+\lambda_2)x_0+\lambda_2 R_2-\lambda_3} - \frac{1}{\lambda_1}(e^{-\lambda_1 x_0} - 1)$$

(hereinafter "equation 24"). Thus, the variables $\lambda_1$, $\lambda_2$, and $\lambda_3$ may be calculated by solving a system of three non-linear equations using equation 6. Again, the processing unit to solve the non-linear numerical equations may be included within the data modeling element or may be provided using a separate processor.

Applying the above analysis to the inputs 505, the outputs 515 may be displayed. In the exemplary embodiment, the outputs 515 may include frequency of outages, months between outages, a conditional months between outages, and a payout. These outputs were discussed above with reference to the fourth interface 400 of FIG. 4.

Specifically, with the inputs 505, the frequency of outages that results from the above analysis is 0.06 times per month. The months between outages is 17.5 months while the conditional months between outages where the outage lasted longer than 4 hours is 37. The measured availability is 99.96%. With the payout having an annual time frame, the payout results in 0.4%.

Figure 6:
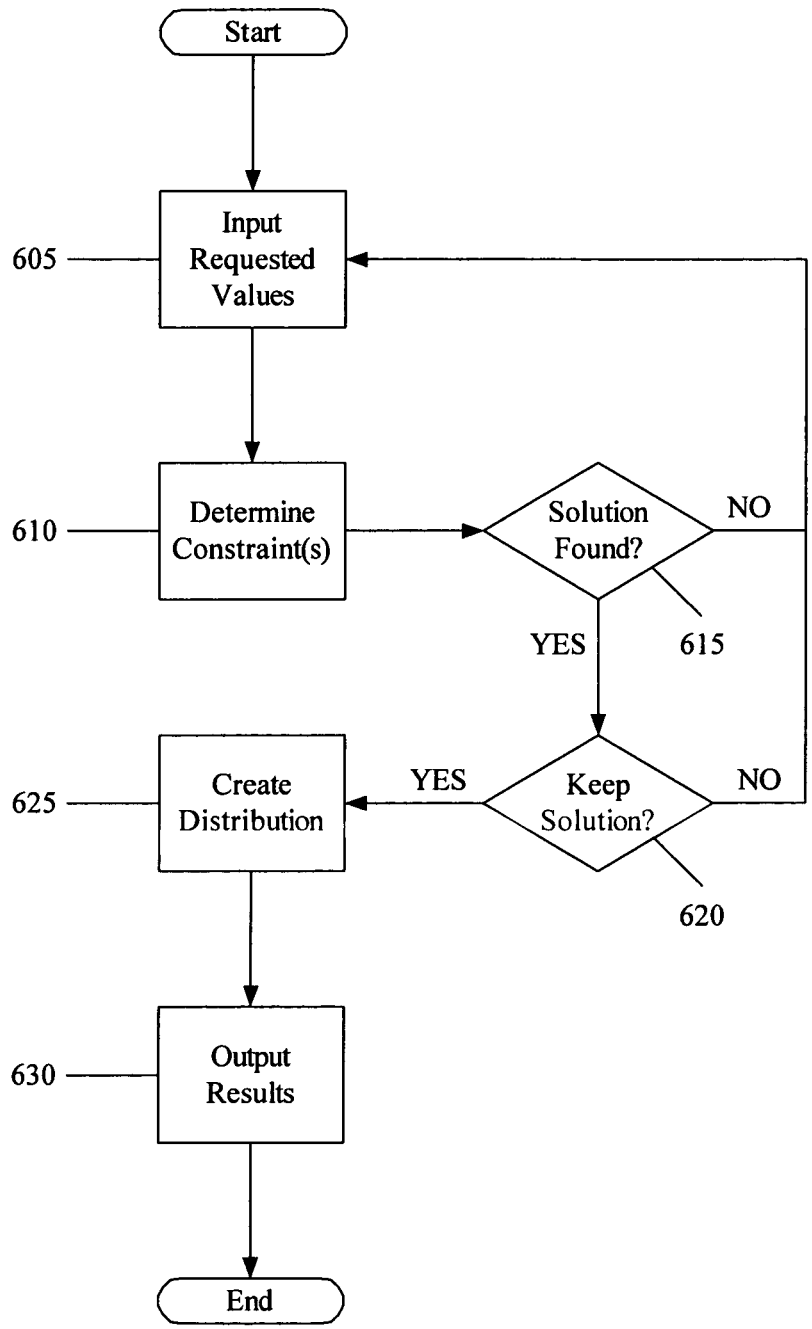
FIG. 6 shows a method of data modeling according to an exemplary embodiment of the present invention.

FIG. 6 shows a method 600 of data modeling according to an exemplary embodiment of the present invention. FIG. 6 will be discussed with reference to the interfaces 100-500 of FIGS. 1-5. Initially, the method 600 includes step 605 where requested values are entered. For example, the requested values may correspond to the inputs 105 of the first interface 100, the inputs 205 of the second interface 200, etc. Upon entering the requested values in step 605, a set of constraint values are determined in step 610.

Step 615 addresses the situation where solutions may or may not be found. As discussed above, a set of inputs may lead to constraints that are zero/negligible which are valid or constraints that are significant which are invalid. Thus, if a solution is found, the method 600 may proceed to step 620. Otherwise, the method 600 returns to step 605.

Step 620 addresses the situation where a solution was found and kept or a solution was found and discarded. As discussed above, a set of inputs may lead to values for constraints that are zero/negligible. However, a user may choose to discard the values nonetheless. Thus, if a solution is kept, the method 600 may proceed to step 625. Otherwise, the method 600 returns to step 605.

With the entered inputs and the determined constraints, a distribution is created for analysis in step 625. The created distribution refers to p in regards to the MEP as discussed above. Thereafter, the method 600 may analyze the set of inputs and constraint values. In step 630, method 600 outputs a corresponding set of results from the performed analysis. The results may be displayed to the user (not shown).

The present invention may be applied to actual scenarios where data has been collected for the respective scenario. In addition, the present invention may be applied to hypothetical scenarios where the data corresponds to the hypothetical scenario. For example, if a projected payout for an actual scenario exceeds a threshold payout value, the service provider may use the present invention to specify a goal and therefore, find an appropriate payout schedule for the service to at least meet the threshold.

Figure 7:
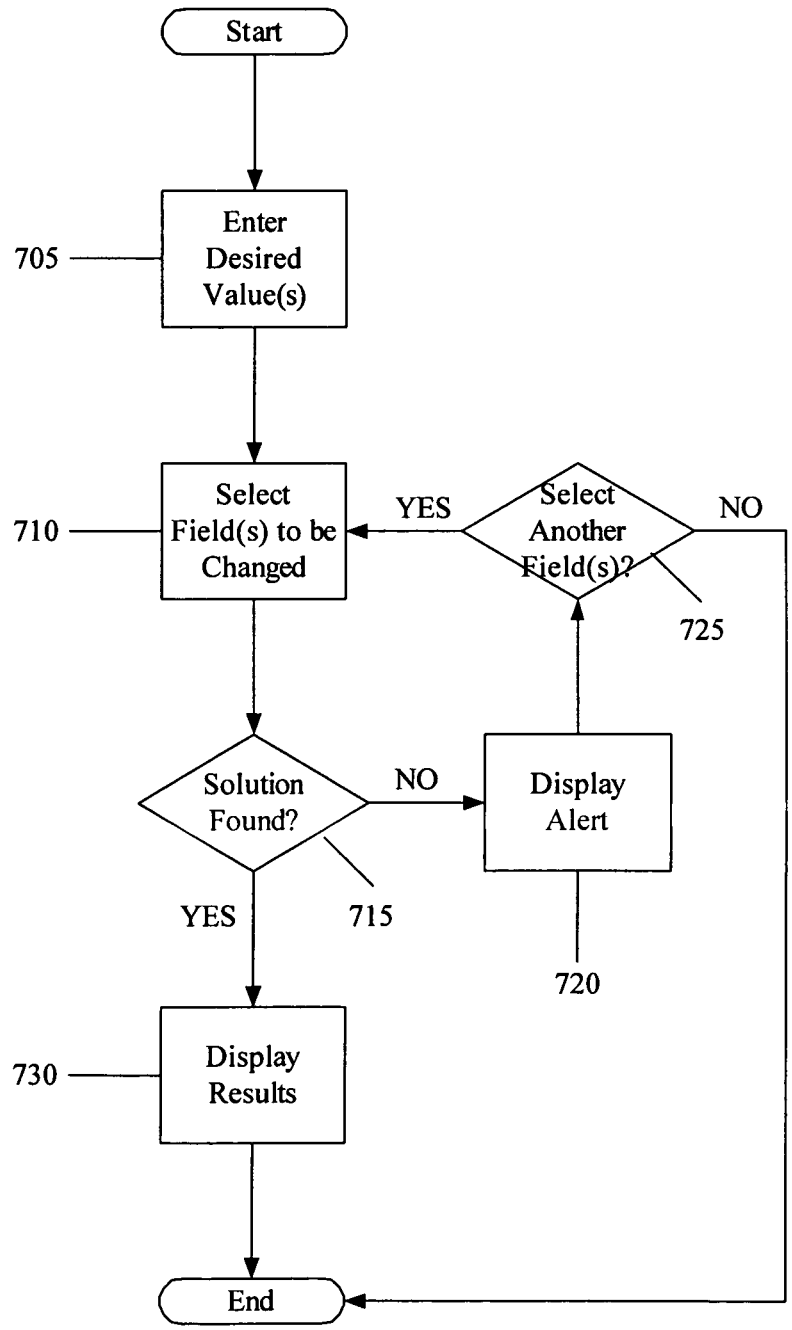
FIG. 7 shows a method of reverse data modeling according to an exemplary embodiment of the present invention.

The present invention may include an option for the user to enter an expected field and alter the input fields to achieve the expected field. FIG. 7 shows an exemplary method 700 of data modeling according to an exemplary embodiment of the present invention. Specifically, the method 700 allows the user to perform an analysis that may begin with an output to determine a set of inputs. For example, if a service provider finds that a current payout is 1.5%, the user may enter a "goal" field of payout=1%. As discussed above, since the payout is an output field, reversing the analysis would result in a set of inputs that would achieve this "goal" field. Thus, a desired output field is entered in step 705. The user may also wish to keep certain input fields while only wanting to change particular input field. Thus, a user may select the input field(s) to be changed in step 710. For example, the payout schedule field may be allowed to be altered. This selection may also include a further option of altering an aspect such as a multiplicative factor within the input field. For example, a payout schedule may be changed to meet the "goal" field.

After inputting a desired value in step 705 and selecting the input field to be changed in step 710, step 715 determines if a solution that meet the criteria is found. The solution may be determined using the reverse analysis discussed above. If a solution is found, the method 700 proceeds to step 730 where the results are displayed. Otherwise, the method 700 proceeds to step 720.

In step 720, an alert is displayed to indicate to the user that no solution has been found. That is, the given criteria (e.g., desired output, selected input field, etc.) do not allow "goal" field to be achieved. Upon alerting the user, the method 700 proceeds to step 725 where an option to select another field is given. A user may have only wished to allow a particular input field to be altered. Thus, the given set of criteria is the only option. The user may choose to end the method 700. Otherwise, the method returns to step 710 where the user selects another field(s) to be changed in order to achieve the "goal" field.

Those skilled in the art will understand that the above described exemplary embodiments may be implemented in any number of manners, including, as a separate software module embodied in a non-transitory computer readable storage medium, as a combination of hardware and software, etc. For example, the method 200 may be run as part of a program containing lines of code that, when compiled, may be executed on a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer readable storage medium including a set of instructions executable by a processor, the set of instructions operable to:
   receive a plurality of numerical values concerning a providing of services across a network;
   determine at least one constraint value depending on the plurality of numerical values, wherein the constraint value corresponds to one of (i) a mean of a distribution of the numerical values, (ii) a first percentile value concerning a first probability with respect to a time to restore exceeding a first time, (iii) a second percentile value concerning a second probability with respect to a time to restore exceeding a second time, and (iv) a conditional mean of the distribution of the numerical values with respect to outages exceeding a threshold time;
   perform a distribution analysis given the plurality of numerical values and the at least one constraint value; and
   output a plurality of results derived from the distribution analysis.

2. The non-transitory computer readable storage medium of claim 1, wherein the plurality of numerical values includes at least one of (i) a mean time to restore, (ii) an availability, (iii) a time, (iv) a probability with respect to a time to restore and the time, (v) an average outage time for outages exceeding the time, (vi) a number of the services failing with a time to restore exceeding the time, (vii) a total number of services, and (viii) a payout schedule.

3. The non-transitory computer readable storage medium of claim 1, wherein the result includes at least one of a frequency of outages, a first value indicating a time between outages, a second value indicating a time between outages that exceed a time to restore, and a payout.

4. The non-transitory computer readable storage medium of claim 1, wherein the set of instructions is further operable to:
   display the at least one constraint value upon determination.

5. The non-transitory computer readable storage medium of claim 4, wherein the set of instructions is further operable to one of:
   retain the at least one constraint value and,
   discard the at least one constraint value.

6. The non-transitory computer readable storage medium of claim 5, wherein the set of instructions is further operable to:
   upon discarding the at least one constraint value, receive a second plurality of values.

7. The non-transitory computer readable storage medium of claim 1, wherein the distribution analysis derives from Maximum Entropy principles.

8. The non-transitory computer readable storage medium of claim 1, wherein the plurality of numerical values is one of known values, hypothetical values, and desired values.

9. The non-transitory computer readable storage medium of claim 8, wherein when the plurality of numerical values is desired values, the plurality of results relate to changes to be made.

10. The non-transitory computer readable storage medium of claim 8, wherein the set of instructions is further operable to:
when the plurality of numerical values is desired values, select at least one of the plurality of results to remain unchanged.

11. A system, comprising:
a processor; and
a memory storing a set of instructions that are executable by the processor, the set of instructions, when executed by the processor, causing the processor to perform operations including:
receiving a plurality of numerical values relating to providing services on a network;
determining at least one constraint value depending on the plurality of numerical values, the constraint value corresponding to one of (i) a mean of a distribution of the numerical values, (ii) a first percentile value concerning a first probability with respect to a time to restore exceeding a first time, (ii) a second percentile value concerning a second probability with respect to a time to restore exceeding a second time, and (iv) a conditional mean of the distribution of the numerical values with respect to outages exceeding a threshold time;
performing a distribution analysis given the plurality of numerical values and the at least one constraint value; and
outputting a result derived from the distribution analysis.

12. The system of claim 11, wherein the plurality of numerical values includes at least one of (i) a mean time to restore, (ii) an availability, (iii) a time, (iv) a probability with respect to a time to restore and the time, (v) an average outage time for outages exceeding the time, (vi) a number of the services failing with a time to restore exceeding the time, (vii) a total number of services, and (viii) a payout schedule.

13. The system of claim 11, wherein the results include at least one of a frequency of outages, a first value indicating a time between outages, a second value indicating a time between outages that exceed a time to restore, and a payout.

14. The system of claim 11, wherein the operations further include:
displaying the at least one constraint value upon determination.

15. The system of claim 14, wherein the operations further include:
selecting one of retaining the at least one constraint value and discarding the at least one constraint value.

16. The system of claim 11, wherein the distribution analysis derives from Maximum Entropy principles.

17. The system of claim 11, wherein the plurality of numerical values is one of known values, hypothetical values, and desired values.

18. The system of claim 17, wherein when the plurality of numerical values is desired values, the plurality of results relate to changes to be made.

* * * * *